(12) United States Patent
Holm

(10) Patent No.: US 9,924,836 B2
(45) Date of Patent: Mar. 27, 2018

(54) MIXER HOUSEHOLD APPLIANCE

(75) Inventor: Henrik Holm, Stockholm (SE)

(73) Assignee: Aktiebolaget Electrolux, Stockholm (SE)

( * ) Notice: Subject to any disclaimer, the term of this patent is extended or adjusted under 35 U.S.C. 154(b) by 617 days.

(21) Appl. No.: 14/378,783

(22) PCT Filed: Feb. 15, 2012

(86) PCT No.: PCT/EP2012/052601
§ 371 (c)(1),
(2), (4) Date: Sep. 8, 2014

(87) PCT Pub. No.: WO2013/120521
PCT Pub. Date: Aug. 22, 2013

(65) Prior Publication Data
US 2015/0036459 A1  Feb. 5, 2015

(51) Int. Cl.
*A47J 43/046* (2006.01)
*A47J 43/07* (2006.01)

(52) U.S. Cl.
CPC ......... *A47J 43/046* (2013.01); *A47J 43/0716* (2013.01)

(58) Field of Classification Search
CPC .................................................. A47J 43/0716
USPC .......................... 366/275, 276, 277, 278, 332
See application file for complete search history.

(56) References Cited

U.S. PATENT DOCUMENTS

| 4,462,694 | A |   | 7/1984 | Ernster et al. |
| 5,297,475 | A | * | 3/1994 | Borger ................ A47J 43/0716 366/205 |
| 2003/0034200 | A1 |   | 2/2003 | Bohannon et al. |
| 2005/0152215 | A1 |   | 7/2005 | Stuart et al. |
| 2012/0241588 | A1 | * | 9/2012 | Dos Santos Rodrigues .............. A47J 43/0716 248/636 |

FOREIGN PATENT DOCUMENTS

| CN | 201279085 | 7/2009 |
| GB | 953292 | 3/1964 |

OTHER PUBLICATIONS

International Search Report for PCT International Application No. PCT/EP2012/052601 dated Apr. 5, 2012.

* cited by examiner

*Primary Examiner* — Tony G Soohoo
*Assistant Examiner* — Elizabeth Insler
(74) *Attorney, Agent, or Firm* — RatnerPrestia

(57) ABSTRACT

A mixer appliance having a base unit and a container unit. The base unit has a motor with a drive shaft. The container unit has a container and a rotor with a rotor shaft and a rotor element. A coupling arrangement connects the drive shaft and the rotor shaft when the container unit is connected to the base unit. A longitudinal axis extends through the drive shaft, coupling arrangement, and rotor shaft. The container unit has a bottom portion with a flexible diaphragm and a bearing member. The bearing member is supported by the flexible diaphragm, and the rotor shaft extends through the bearing member. The flexible diaphragm provides flexibility perpendicularly to the longitudinal axis, such that the bearing member is displaceable perpendicularly to the longitudinal axis to align the rotor shaft with the drive shaft along the longitudinal axis when the container unit is connected to the base unit.

12 Claims, 4 Drawing Sheets

MIXER HOUSEHOLD APPLIANCE

This application is a National Stage Application of International Application No. PCT/EP2012/052601, filed Feb. 15, 2012, the entire disclosure of which is expressly incorporated by reference herein.

TECHNICAL FIELD

The present invention relates to a mixer household appliance generally used for mixing, blending, and/or cutting foodstuff.

BACKGROUND

A mixer household appliance for mixing, blending, and/or cutting foodstuff commonly comprises two units, a base unit comprising an electric motor and forming a support for the appliance, and a container unit comprising a container for the foodstuff and a rotor element arranged in the container. The container unit is provided with a lid covering an opening of the container. Such an appliance may be referred to under different names such as inter alia mixer, food mixer, blender, or food blender. The rotor element is rotated by means of the electric motor. The base unit and the container unit are separable from each other and a separable coupling arrangement is provided between the electric motor and the rotor element.

During operation noise is emitted from a mixer appliance. Noise emanates from various parts and positions of the mixer appliance, e.g. the electric motor, the separable connection, the rotor element, and foodstuff being mixed or cut by the rotor element.

Various solutions have been proposed to reduce the noise level emitted from a mixer. For instance, each of US 2005/152215 and US 2003/034200 proposes an enclosure enclosing the container unit of a blender.

GB 953292 discloses a shaft coupling for use in e.g. a blender. The shaft coupling is arranged for use between mutually adjacent ends of two approximately axially aligned rotatable shafts. One of the mutually adjacent ends of one of the shafts has a plurality of axial rubber-like projections fixed thereto. Each projection has one end thereof fixed relative to the one shaft and the opposite end thereof free and extending toward the other shaft. A wheel fixed to the other shaft has smooth, rigid spokes fitting in the spaces between the projections.

U.S. Pat. No. 4,462,694 discloses an electric blender being provided with a two-piece shaft assembly which overcomes the need for very accurate alignment of shaft supporting bearings. By having two parts which are coupled by a spline connection, a limited amount of misalignment of bearings of the two-piece shaft is accommodated without any binding between the shaft and the bearings. Misalignment is not prevented in the electric blender of U.S. Pat. No. 4,462,694. A lightweight stainless steel diaphragm and a sealing gasket are arranged for sealing against a bottom wall of a glass vessel of the blender.

A further reduction of noise emitted from a mixer household appliance and/or alternative ways of reducing noise emitted from a mixer household appliance are desirable.

SUMMARY

An object of the present invention is to provide a mixer household appliance with a low noise level.

According to an aspect of the invention, the object is achieved by a mixer household appliance comprising a base unit and a container unit. The base unit comprises a housing and an electric motor comprising a drive shaft. The container unit comprises a container for foodstuff and a rotor. The rotor comprises a rotor shaft and a rotor element arranged inside the container at a first end of the container unit. The container unit is removably connected to the base unit and a coupling arrangement forms a connection between the drive shaft and the rotor shaft when the container unit is connected to the base unit. A longitudinal axis extends through the drive shaft, the coupling arrangement, and the rotor shaft when the container unit is connected to the base unit. The coupling arrangement comprises a first coupling member and a second coupling member being arranged to engage with each other. The first coupling member is connected to the rotor shaft and arranged outside the container at the first end of the container unit and the second coupling member is connected to the drive shaft and arranged outside the housing. The container unit further comprises a bottom portion arranged at the first end, which bottom portion comprises a flexible diaphragm and a bearing member, wherein the bearing member is supported by the flexible diaphragm and the rotor shaft extends through the bearing member. The flexible diaphragm provides flexibility in a direction perpendicularly to the longitudinal axis such that the bearing member is displaceable perpendicularly to the longitudinal axis to align the rotor shaft with the drive shaft along the longitudinal axis when the container unit is connected to the base unit.

Since the rotor shaft and the drive shaft of the electric motor are aligned by the rotor being flexibly suspended in the flexible diaphragm, during use of the mixer household appliance no noise is emitted from the coupling arrangement, or at least considerably less noise is emitted from the coupling arrangement than in mixer household appliances, in which there is a misalignment between the rotor shaft and the drive shaft. As a result, the above mentioned object is achieved.

When the container unit is placed on the base unit to connect the container unit to the base unit, thanks to the suspension of the bearing member in the flexible diaphragm, the first coupling member engages with the second coupling member. Thus, the rotor shaft is aligned with the drive shaft along the longitudinal axis. The coupling arrangement forms a separable connection. The mixer household appliance may be arranged for mixing, blending, and/or cutting foodstuff. The base unit may form a support of the appliance, which base unit is placed upon a supporting surface during use of the appliance. The rotor is rotated by means of the electric motor. The rotor element may comprise a cutting element. The container unit may comprise a sleeve at its first end. A free end of the sleeve may form a bottom surface, upon which the container unit may stand when the container unit is not connected to the base unit. The coupling arrangement may form a direct connection between the rotor and the drive shaft of the motor, i.e. the rotor may be directly driven by the electric motor. A transmission may be arranged between the electric motor and the rotor, in which case the term drive shaft may refer to an outgoing drive shaft of the transmission.

According to embodiments the flexible diaphragm may be manufactured from an elastomer. For instance, the elastomer may be a TPE (Thermo Plastic Elastomer), rubber, or silicone.

According to embodiments, the first and second coupling members may be arranged to align the rotor shaft with the drive shaft along the longitudinal axis when the container unit is connected to the base unit. In this manner, when engaging with each other, the first and second coupling members may be arrange to align the rotor shaft with the drive shaft of the electric motor by parallel displacement of the bearing member by means of flexing the diaphragm.

According to embodiments, a radial play between the first and second coupling members is less than 0.05 mm when the container unit is connected the base unit. In this manner an alignment within 0.05 mm of the rotor shaft and the drive shaft of the electric motor may be achieved. A radial play extends in a direction substantially perpendicularly to the longitudinal axis.

According to embodiments, an axial play between the first and second coupling members is less than 0.05 mm when the container unit is connected to the base unit. In this manner a tight connection in the axial direction between the rotor shaft and the drive shaft may be achieved. An axial play extends in a direction substantially along the longitudinal axis.

According to embodiments, the bottom portion further may comprise a supporting member. The supporting member may comprise a sleeve with a sleeve axis. The sleeve axis and the longitudinal axis may be substantially aligned. The sleeve may be arranged around the bearing member. In this manner the bearing member may be supported by the sleeve in certain operating situations.

According to embodiments, a first distance, in a direction perpendicularly to the longitudinal axis, between the sleeve and the bearing member or the diaphragm may be within a range of around 0.1-3 mm. In this manner the bearing member may be supported by the sleeve in operating situations when the longitudinal axis moves more than 0.1-3 mm laterally within the sleeve of the mixer appliance.

According to embodiments, a flange may be arranged at an inner surface of the sleeve, which flange faces an end surface of the bearing member. In this manner the bearing member may be supported by the flange in certain operating situations.

According to embodiments, a second distance, in a direction parallel with the longitudinal axis, between the flange and the end surface of the bearing member or the diaphragm may be within a range of around 0.1-5 mm. In this manner the bearing member may be supported in certain operating situations when the rotor moves along the axis towards the flange.

According to embodiments, one of the first and second coupling members may be provided with a conical outer surface, and the other of the first and second coupling members may be provided with a conical inner surface. The conical inner and outer surfaces may abut against each other when the container unit is connected to the base unit. In this manner a good alignment between the rotor shaft and the drive shaft may be achieved. The expression conical surface is understood to encompass a truncated conical surface.

According to embodiments, one of the first and second coupling members may be provided with angled slots, and the other of the first and second coupling members may be provided with protrusions. The protrusions may engage with the slots when the container unit is connected to the base unit. In this manner a stable connection may be provided between the first and second coupling members.

Further features of, and advantages with, the present invention will become apparent when studying the appended claims and the following detailed description. Those skilled in the art will realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully with reference to the accompanying drawings, in which example embodiments are shown. However, this invention should not be construed as limited to the embodiments set forth herein. Disclosed features of example embodiments may be combined as readily understood by one of ordinary skill in the art to which this invention belongs. Like numbers refer to like elements throughout.

Well-known functions or constructions will not necessarily be described in detail for brevity and/or clarity.

Figure 1:
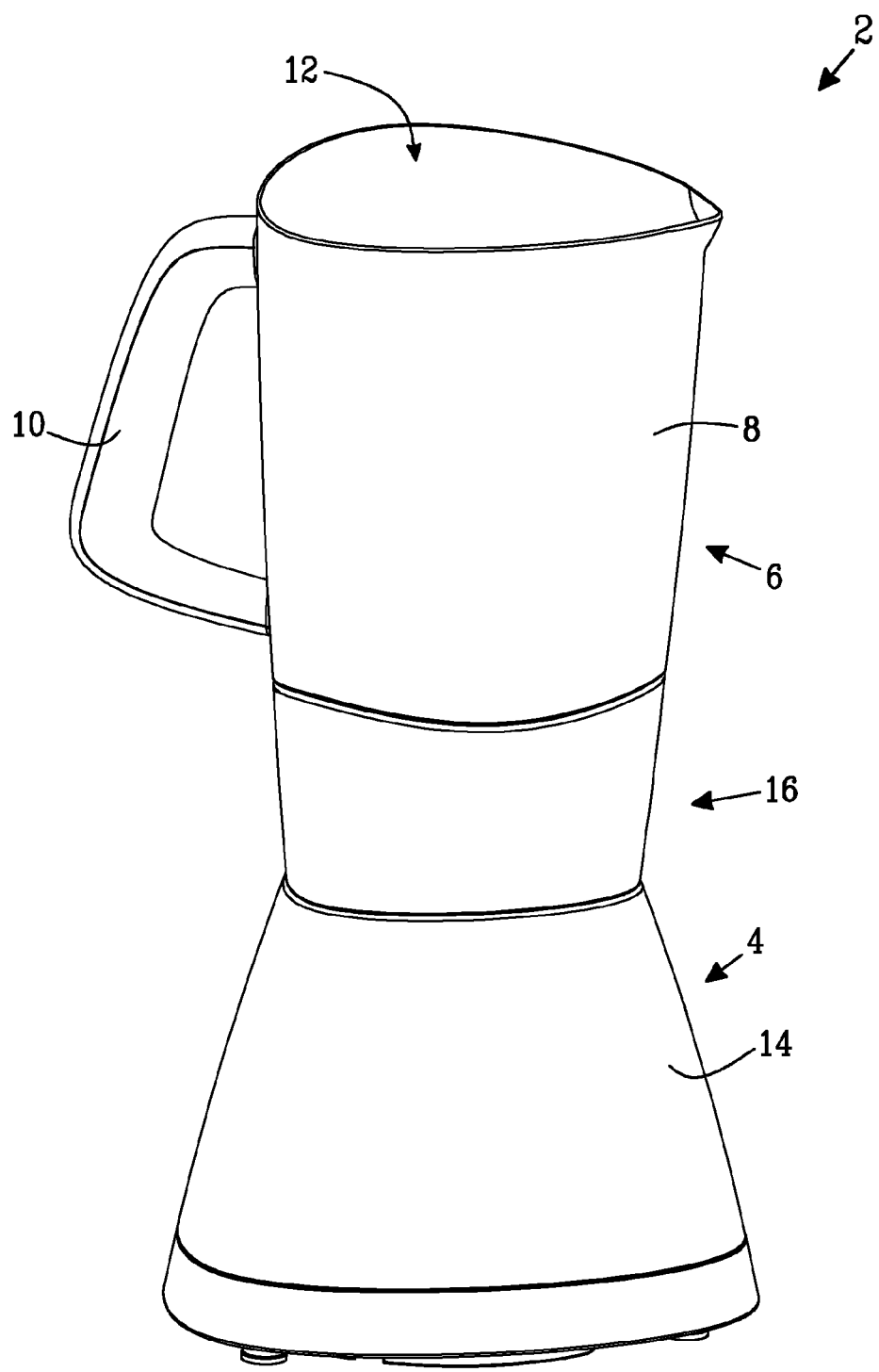
FIG. 1 illustrates a mixer household appliance according to embodiments.

FIG. 1 illustrates a mixer household appliance 2 according to embodiments, in the following called mixer 2. The mixer 2 comprises a base unit 4 and a container unit 6. The container unit 6 comprises a container 8 in which foodstuff is placed, e.g. to be mixed, cut, and/or blended. The container unit 6 is releasably connected to the base unit 4. A handle 10 is provided on the container unit 6. A lid (not shown) may be placed on the container unit 6 to cover an opening 12 of the container 8 to hold foodstuff inside the container 8, e.g. during mixing. The base unit 4 forms a support for the mixer 2. The base unit 4 may be placed on a supporting surface during operation of the mixer 2. The base unit 4 comprises a housing 14, inside which an electric motor is arranged. The base unit 4 may further comprise a switch (not shown) for controlling the electric motor and a power cord (not shown) for connecting the electric motor to an electric wall socket.

The electric motor is arranged to drive a rotor arranged in the container unit 6 at a first end 16 of the container unit 6. The container unit 6 comprises a bottom portion arranged at the first end 16 of the container unit 6. The rotor is arranged at the bottom portion of the container unit 6.

Figure 2:
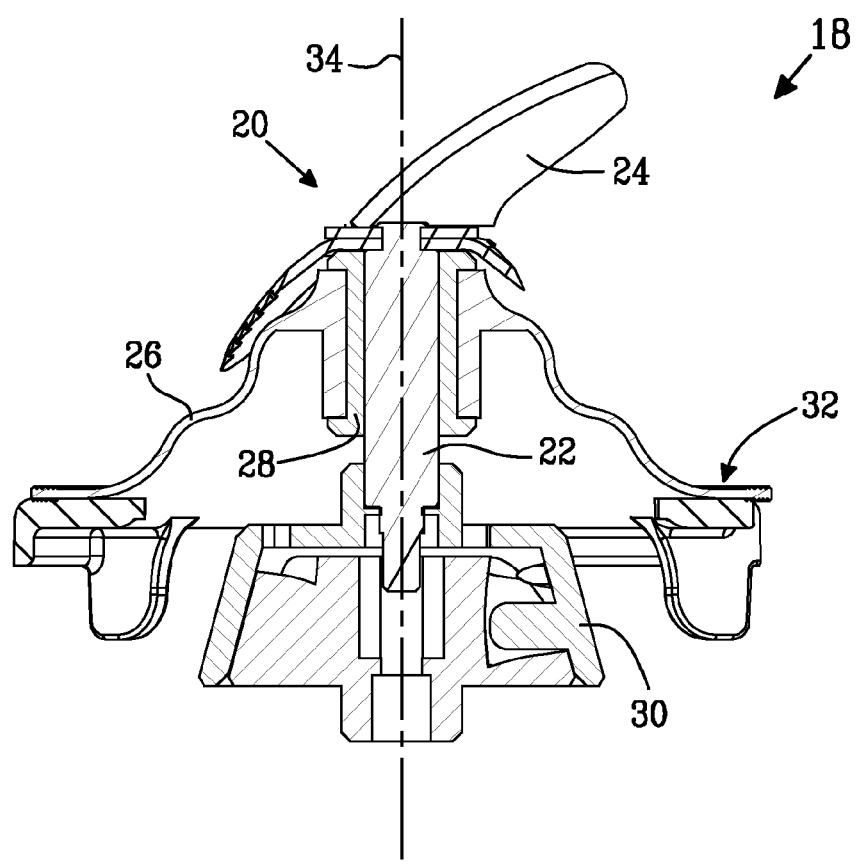
FIGS. 2 and 3 illustrate bottom portions of container units of mixers according to embodiments.

FIG. 2 illustrates cross section of a bottom portion 18 of a container unit of a mixer according to embodiments. A rotor 20 comprising a rotor shaft 22 and a rotor element 24 is arranged in the bottom portion 18. The bottom portion 18 comprises a flexible diaphragm 26 and a bearing member 28. The bearing member 28 is supported by the flexible diaphragm 26. The rotor shaft 22 extends through the bearing member 28 and is rotatably supported by the bearing member 28. At an end of the rotor shaft 22 opposite to the rotor element 24, a first coupling member 30 is connected to the rotor shaft 22.

The bottom portion 18 and a wall element (not shown) are comprised in a container of the container unit. An end surface of the wall element is arranged to abut and seal circumferentially against a surface 32 of the bottom portion 18. The bottom portion 18 is thus arranged at a first end of the container unit. The first coupling member 30 is arranged outside the container at the first end of the container unit.

The first coupling member 30 is arranged to releasably engage with a second coupling member of a base unit of the mixer. Thus the container unit may be releasably connected to the base unit. A longitudinal axis 34 extends through the first coupling arrangement 30 and the rotor shaft 22. The flexible diaphragm 26 may be manufactured from an elastomer and provides flexibility, inter alia in a direction perpendicularly to the longitudinal axis 34 such that the bearing member 28 is displaceable perpendicularly to the longitudinal axis 34.

Figure 3:
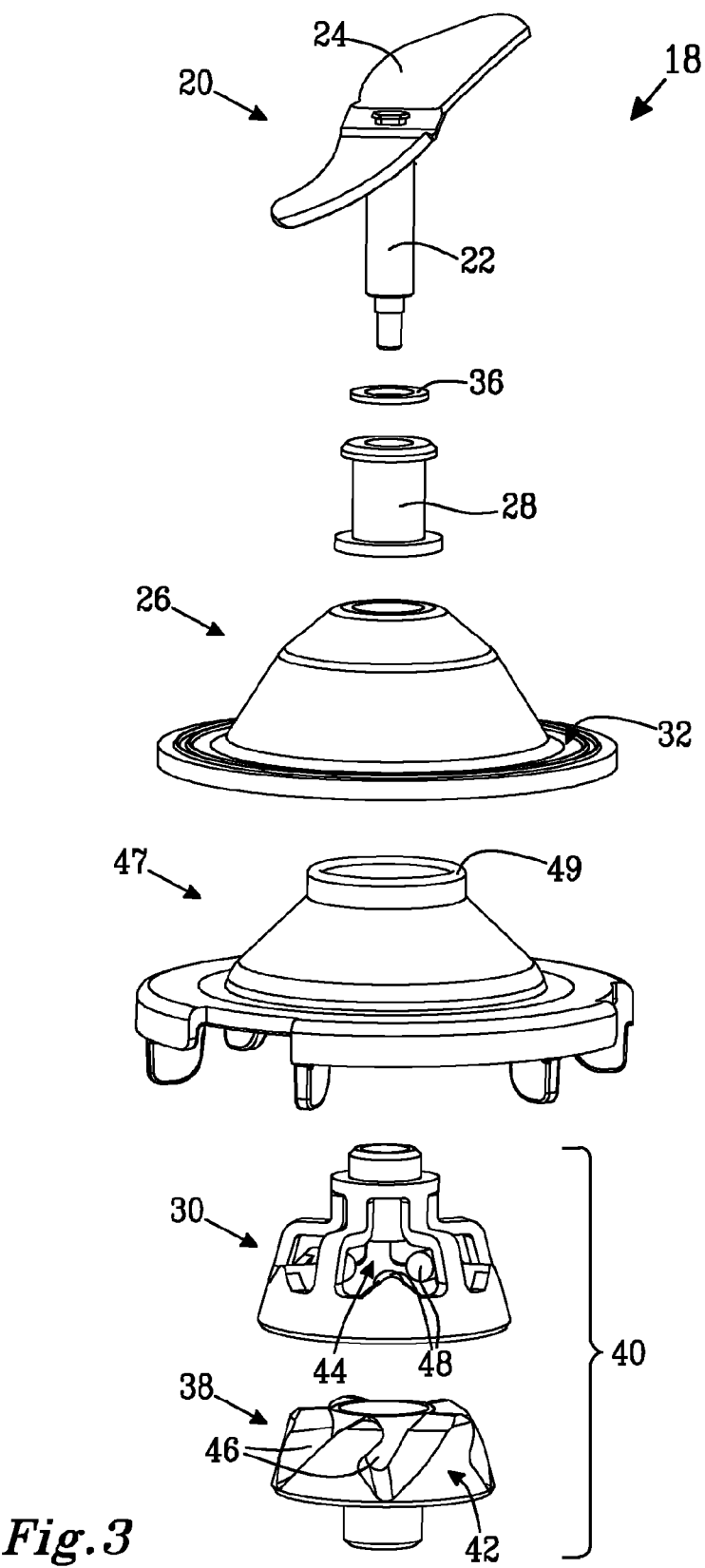

FIG. 3 illustrates an exploded view of a bottom portion 18 of a container unit of a mixer according to embodiments. A rotor 20 comprising a rotor shaft 22 and a rotor element 24 is arranged in the bottom portion 18. The bottom portion 18 comprises a flexible diaphragm 26 and a bearing member 28. The bearing member 28 is supported by the flexible diaphragm 26. The rotor shaft 22 extends through the bearing member 28 and is rotatably supported by the bearing member 28. A washer 36 is arranged between the rotor element 24 and the bearing member 28. At an end of the rotor shaft 22 opposite to the rotor element 24, a first coupling member 30 is connected to the rotor shaft 22. Again, the bottom portion 18 and a wall element (not shown) are comprised in a container of the container unit. An end surface of the wall element is arranged to abut and seal circumferentially against a surface 32 of the bottom portion 18. The first coupling member 30 is arranged outside the container at a first end of the container unit.

The first coupling member 30 is arranged to releasably engage with a second coupling member 38 of a base unit of the mixer. The first and second coupling members 30, 38 form a coupling arrangement 40 of the mixer. The second coupling member 38 is connected to a drive shaft of an electric motor of a base unit and is arranged outside a housing of the base unit.

The second coupling member 38 is provided with a conical outer surface 42. The first coupling member 30 is provided with a conical inner surface 44. The conical inner and outer surfaces 44, 42 abut against each other when the container unit is connected to the base unit. Thus, the rotor shaft 22 will be aligned with the drive shaft of the electric motor along a longitudinal axis when the container unit is connected to the base unit. The second coupling member 38 is provided with angled slots 46 at the conical outer surface 44. The first coupling member 30 is provided with protrusions 48 at its conical inner surface 44. The protrusions 48 engage with the slots 46 when the container unit is connected to the base unit.

The flexible diaphragm 26 provides flexibility at least in a direction perpendicularly to the rotor shaft 22 and the bearing member 28. The bottom portion 18 comprises a supporting member 47. The supporting member 47 comprises a sleeve 49. The sleeve 49 is arranged around the bearing member 28. There is a radial play and an axial play between the sleeve 49 and the bearing member 28 and/or the flexible diaphragm 26. Thus, the sleeve 49 may support the flexible diaphragm 26 and the bearing member 28 in certain operating situations. For instance, when frozen or semi-frozen foodstuff in the form of berries are to be mixed, cut, or blended in the mixer, the rotor 20 may be subjected to forces, which displace the rotor 20, and with it, the bearing member 28. In such situations the sleeve 49 supports the flexible diaphragm 26 and the bearing member 28.

Figure 4:
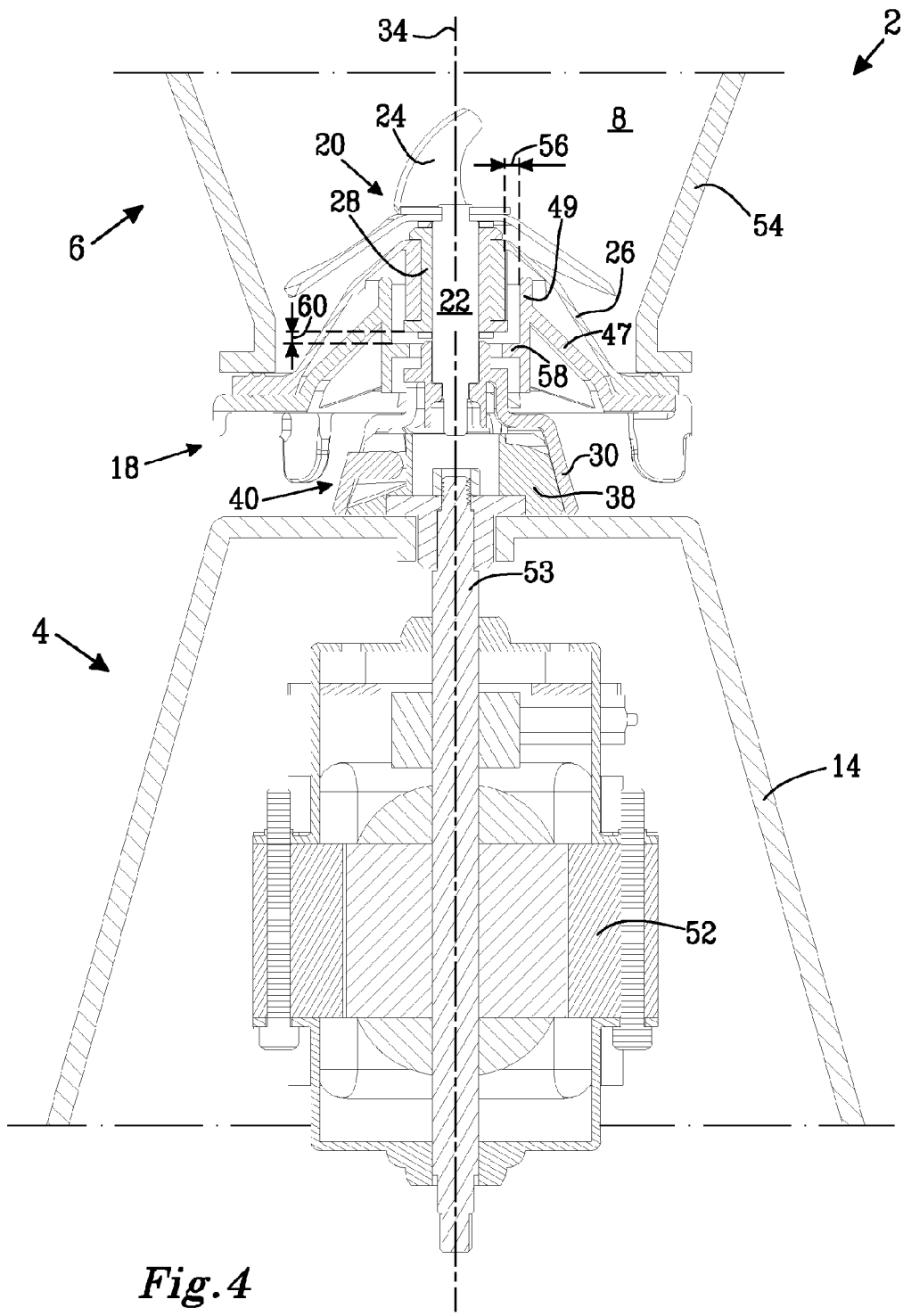
FIG. 4 illustrates a cross section of a portion of a mixer according to embodiments.

FIG. 4 illustrates a cross section of a portion of a mixer 2 according to embodiments. The mixer 2 comprises a base unit 4 and a container unit 6. The container unit 6 comprises a container 8 in which foodstuff may be put. The container unit 6 is releasably connected to the base unit 4. The base unit 4 comprises a housing 14, inside which an electric motor 52 comprising a drive shaft 53 is arranged. The container 8 comprises a bottom portion 18 and a wall element 54. The container unit 6 comprises a rotor 20 arranged in the bottom portion 18. The rotor 20 comprises a rotor shaft 22 and a rotor element 24. A coupling arrangement 40 forms a connection between the drive shaft 53 and the rotor shaft 22 when the container unit 6 is connected to the base unit 4, as illustrated in FIG. 4. A longitudinal axis 34 extends through the drive shaft 53, the coupling arrangement 40, and the rotor shaft 22 when the container unit 6 is connected to the base unit 4.

The coupling arrangement 40 comprises a first coupling member 30 and a second coupling member 38 arranged to engage with each other. The first coupling member 30 is connected to the rotor shaft 22 and arranged outside the container 8 at a first end 16 of the container unit 6. The second coupling member 38 is connected to the drive shaft 53 and arranged outside the housing 14. The first and second coupling members 30, 38 are arranged to align the rotor shaft 22 with the drive shaft 53 along the longitudinal axis 34 when the container unit 6 is connected to the base unit 4.

The bottom portion 18 comprises a flexible diaphragm 26 and a bearing member 28. The bearing member 28 is supported by the flexible diaphragm 26. The rotor shaft 22 extends through the bearing member 28 and is rotatably supported by the bearing member 28.

The flexible diaphragm 26 provides flexibility at least in a direction perpendicularly to the longitudinal axis 34. The bottom portion 18 comprises a supporting member 47. The supporting member 47 comprises a sleeve 49 with a sleeve axis. The sleeve axis and the longitudinal axis 34 are substantially aligned. The sleeve 49 is arranged around the bearing member 28. The sleeve 49 may support the flexible diaphragm 26 and the bearing member 28 in certain operating situations as explained above in connection with FIG. 3. The electric motor 52 and/or the drive shaft 53 may be elastically suspended in the housing 14 of the base unit 4. Thus, since the coupling arrangement 40 transfers forces applied to the rotor element 24 in certain operating situations to the drive shaft 53 and the electric motor 52 such elastic suspending may reduce vibrations in the mixer 2 and noise emitted from the mixer 2.

A first distance 56, in a direction perpendicularly to the longitudinal axis 34, between the sleeve 49 and the bearing member 28 or the diaphragm 26 is within a range of 0.1-3 mm. A flange 58 is arranged at an inner surface of the sleeve 49. The flange 58 faces an end surface of the bearing member 28. A second distance 60, in a direction parallel with the longitudinal axis 34, between the flange and the end surface of the bearing member 28 or the diaphragm 26 is within a range of 0.1-5 mm.

Example embodiments described above may be combined as understood by a person skilled in the art. Although the invention has been described with reference to example embodiments, many different alterations, modifications and the like will become apparent for those skilled in the art. For instance, the second coupling member may be provided with a conical inner surface and the first coupling member may be provided with a conical outer surface. The second coupling member may be provided with protrusions and he first coupling member may be provided with slots.

Therefore, it is to be understood that the foregoing is illustrative of various example embodiments and the invention is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A mixer household appliance comprising:
a base unit comprising a housing and an electric motor comprising a drive shaft;
a container unit removably connected to the base unit, the container unit comprising a container having a first end, a rotor comprising a rotor shaft and a rotor element inside the container at the first end of the container unit, a bottom portion at the first end of the container, and a wall extending from the bottom portion, the bottom portion comprising a bearing member, a flexible diaphragm extending from the bearing member to the wall to form the bottom portion, and a support member extending from the from the bearing member to the wall, wherein the bearing member is supported by the flexible diaphragm, the flexible diaphragm is supported by the support member and moves relative to the support member, and the rotor shaft extends through the bearing member; and
a coupling arrangement configured to form a connection between the drive shaft and the rotor shaft when the container unit is connected to the base unit, such that a longitudinal axis extends through the drive shaft, the coupling arrangement, and the rotor shaft when the container unit is connected to the base unit, the coupling arrangement comprising a first coupling member and a second coupling member being configured to engage with each other,
wherein the first coupling member is connected to the rotor shaft and arranged outside the container at the first end of the container unit, and the second coupling member is connected to the drive shaft and arranged outside the housing, and
wherein the flexible diaphragm provides flexibility in a direction perpendicularly to the longitudinal axis such that the bearing member is displaceable perpendicularly to the longitudinal axis to align the rotor shaft with the drive shaft along the longitudinal axis when the container unit is connected to the base unit.

2. The mixer household appliance according to claim 1, wherein the flexible diaphragm is manufactured from an elastomer.

3. The mixer household appliance according to claim 1, wherein the first and second coupling members are arranged to align the rotor shaft with the drive shaft along the longitudinal axis when the container unit is connected to the base unit.

4. The mixer household appliance according to claim 1, wherein a radial play between the first and second coupling members is less than 0.05 mm when the container unit is connected to the base unit.

5. The mixer household appliance according to claim 1, wherein an axial play between the first and second coupling members is less than 0.05 mm when the container unit is connected to the base unit.

6. The mixer household appliance according to claim 1, wherein the supporting member comprises a sleeve with a sleeve axis, wherein the sleeve axis and the longitudinal axis are substantially aligned, and wherein the sleeve is arranged around the bearing member.

7. The mixer household appliance according to claim 6, wherein a first distance, in a direction perpendicularly to the longitudinal axis, between the sleeve and the bearing member or the diaphragm is within a range of around 0.1-3 mm.

8. The mixer household appliance according to claim 6, wherein a flange is arranged at an inner surface of the sleeve, which flange faces an end surface of the bearing member.

9. The mixer household appliance according to claim 8, wherein a second distance, in a direction parallel with the longitudinal axis, between the flange and the end surface of the bearing member or the diaphragm is within a range of around 0.1-5 mm.

10. The mixer household appliance according to claim 1, wherein one of the first and second coupling members is provided with a conical outer surface, and the other of the first and second coupling members is provided with a conical inner surface, and wherein the conical inner and outer surfaces abut against each other when the container unit is connected to the base unit.

11. The mixer household appliance according claim 1, wherein one of the first and second coupling members is provided with angled slots, and the other of the first and second coupling members is provided with protrusions, and wherein the protrusions engage with the slots when the container unit is connected to the base unit.

12. The mixer household appliance according to claim 10, wherein one of the first and second coupling members is provided with angled slots, and the other of the first and second coupling members is provided with protrusions, and wherein the protrusions engage with the slots when the container unit is connected to the base unit.

* * * * *